(12) United States Patent
Stephens, Jr.

(10) Patent No.: US 11,863,436 B2
(45) Date of Patent: Jan. 2, 2024

(54) INTELLIGENT INTERNET TRAFFIC ROUTING

(71) Applicant: Comcast Cable Communications, LLC, Philadelphia, PA (US)

(72) Inventor: James Howard Stephens, Jr., Austin, TX (US)

(73) Assignee: COMCAST CABLE COMMUNICATIONS, LLC, Philadelphia, PA (US)

(*) Notice: Subject to any disclaimer, the term of this patent is extended or adjusted under 35 U.S.C. 154(b) by 0 days.

(21) Appl. No.: 18/157,018

(22) Filed: Jan. 19, 2023

(65) Prior Publication Data

US 2023/0269179 A1 Aug. 24, 2023

Related U.S. Application Data

(63) Continuation of application No. 17/302,894, filed on May 14, 2021, now Pat. No. 11,601,363.

(51) Int. Cl.
*H04L 45/42* (2022.01)
*H04L 41/0604* (2022.01)
*H04L 65/102* (2022.01)
*H04L 45/00* (2022.01)

(52) U.S. Cl.
CPC .......... *H04L 45/42* (2013.01); *H04L 41/0627* (2013.01); *H04L 45/22* (2013.01); *H04L 65/102* (2013.01)

(58) Field of Classification Search
CPC ..... H04L 45/42; H04L 41/0627; H04L 45/22; H04L 65/102

USPC ......................................................... 709/238
See application file for complete search history.

(56) References Cited

U.S. PATENT DOCUMENTS

| | | | |
|---|---|---|---|
| 9,094,698 B2 * | 7/2015 | Charania | H04N 21/2402 |
| 9,532,103 B2 * | 12/2016 | AbiEzzi | H04N 21/4518 |
| 9,596,213 B2 * | 3/2017 | Pham | H04L 63/0236 |
| 9,608,717 B1 | 3/2017 | Mathews et al. | |
| 9,985,875 B1 | 5/2018 | Srinath et al. | |
| 10,432,688 B2 * | 10/2019 | Harden | H04L 12/4633 |
| 10,469,392 B2 * | 11/2019 | Dowlatkhah | H04L 47/2425 |
| 10,516,605 B2 | 12/2019 | Balasubramanian et al. | |
| 10,666,323 B1 | 5/2020 | Vannucci et al. | |
| 10,972,358 B2 | 4/2021 | Papaloukopoulos et al. | |
| 11,108,651 B1 | 8/2021 | Mermoud et al. | |
| 11,216,309 B2 * | 1/2022 | Piercey | G06F 9/5016 |
| 11,240,702 B2 | 2/2022 | Rahman et al. | |

(Continued)

OTHER PUBLICATIONS

US Patent Application filed on May 14, 2021, entitled "Intelligent Internet Traffic Routing", U.S. Appl. No. 17/302,894.

*Primary Examiner* — Melvin H Pollack
(74) *Attorney, Agent, or Firm* — BakerHostetler

(57) ABSTRACT

A primary internet connection via a gateway or router located at a premises may be used to route internet traffic from devices located at the premises. A change in the primary internet connection, such as a loss or a degradation of the connection, may occur. Based on the change in the primary internet connection, metrics of alternative internet connections, such as cellular or hotspot connections, may be used to select one of the alternative internet connections. Internet traffic may be routed via the selected alternative internet connection until the primary internet connection is reestablished or improves.

34 Claims, 5 Drawing Sheets

(56) References Cited

U.S. PATENT DOCUMENTS

| | | | |
|---|---|---|---|
| 11,265,733 B1* | 3/2022 | Hatamian | H04W 4/38 |
| 11,350,174 B1 | 5/2022 | Zhou et al. | |
| 11,368,853 B2* | 6/2022 | Khalid | H04W 8/005 |
| 11,374,776 B2 | 6/2022 | Guim et al. | |
| 11,470,687 B2* | 10/2022 | Sevindik | H04W 84/12 |
| 11,502,895 B1* | 11/2022 | Van Oort | H04L 12/4633 |
| 11,522,785 B2* | 12/2022 | Dhanabalan | H04L 63/18 |
| 11,553,217 B2* | 1/2023 | Jayawardene | H04N 21/23106 |
| 11,601,363 B2* | 3/2023 | Stephens, Jr. | H04L 41/0627 |
| 11,729,044 B2* | 8/2023 | Tahhan | H04L 41/046 |
| | | | 709/223 |
| 2015/0281020 A1* | 10/2015 | Yun | H04W 52/0209 |
| | | | 370/252 |
| 2016/0088636 A1* | 3/2016 | Zhao | H04W 16/14 |
| | | | 455/454 |
| 2016/0330106 A1 | 11/2016 | Menezes et al. | |
| 2016/0330108 A1 | 11/2016 | Gillon et al. | |
| 2016/0352630 A1 | 12/2016 | Kramer et al. | |
| 2017/0078922 A1 | 3/2017 | Raleigh et al. | |
| 2017/0149673 A1 | 5/2017 | Velayudhan | |
| 2017/0163525 A1 | 6/2017 | Fedor et al. | |
| 2018/0077025 A1 | 3/2018 | Helvey et al. | |
| 2018/0302334 A1 | 10/2018 | Osterlund et al. | |
| 2018/0324105 A1 | 11/2018 | Gillon et al. | |
| 2018/0343195 A1 | 11/2018 | Macdonald et al. | |
| 2019/0037418 A1 | 1/2019 | Gunasekara et al. | |
| 2019/0104057 A1 | 4/2019 | Goel et al. | |
| 2019/0324439 A1 | 10/2019 | Cella et al. | |
| 2020/0022005 A1 | 1/2020 | Campos et al. | |
| 2020/0213248 A1 | 7/2020 | Chen | |
| 2020/0213360 A1 | 7/2020 | Ojha et al. | |
| 2020/0225655 A1 | 7/2020 | Cella et al. | |
| 2020/0241891 A1 | 7/2020 | Ll et al. | |
| 2020/0259896 A1 | 8/2020 | Sachs et al. | |
| 2020/0322826 A1 | 10/2020 | Wangler et al. | |
| 2021/0021674 A1 | 1/2021 | Fox et al. | |
| 2021/0076239 A1 | 3/2021 | Hatonen et al. | |
| 2021/0136869 A1 | 5/2021 | Radmand et al. | |
| 2021/0168034 A1 | 6/2021 | Qian et al. | |
| 2021/0195443 A1 | 6/2021 | Agarwal et al. | |
| 2021/0306946 A1* | 9/2021 | Miklós | H04W 48/20 |
| 2021/0328910 A1 | 10/2021 | Ayadurai et al. | |
| 2021/0385646 A1 | 12/2021 | Liu et al. | |
| 2022/0057791 A1 | 2/2022 | Saraf et al. | |
| 2022/0085860 A1 | 3/2022 | Bali | |
| 2022/0200989 A1* | 6/2022 | Andrews | H04L 63/166 |
| 2022/0201581 A1* | 6/2022 | Li | H04W 36/0058 |
| 2023/0269646 A1* | 8/2023 | Dudda | H04W 36/0038 |
| | | | 370/331 |

* cited by examiner

INTELLIGENT INTERNET TRAFFIC ROUTING

CROSS-REFERENCE TO RELATED APPLICATION

This application is a continuation of U.S. patent application Ser. No. 17/302,894, filed May 14, 2021, now U.S. Pat. No. 11,601,363, issued Mar. 7, 2023, which is hereby incorporated by reference in its entirety.

BACKGROUND

Devices located at a premises may establish a wired or wireless connection to a local gateway or router at the premises, and the gateway or router may provide internet connectivity to the premises devices via, for example, a cable or DSL connection to a service provider network. When the internet connection provided by the gateway is lost or degraded, the premises devices may encounter problems in accessing the internet. The problem may not be resolved until the quality of the internet connection improves or is re-established.

SUMMARY

One or more devices located at a premises may establish a wired or wireless connection to a gateway located at the premises. The gateway may be connected to a service provider network via, for example, a cable or DSL connection associated with the service provider network, in order to provide a primary internet connection for use by the premises devices. Internet traffic from the one or more premises devices may be routed to the internet via the primary internet connection provided by the gateway. In the event of a loss or degradation of the primary internet connection, the gateway may determine one or more other devices providing alternative connections to the internet. For example, the gateway may determine one or more cellular devices each providing a cellular data connection to the internet. Or the gateway may determine one or more hotspot devices providing a hotspot connection to the internet. The gateway may monitor or scan, for example periodically, for the presence of other devices providing alternative connections so that it is aware of such devices in the event of a loss or degradation of the primary internet connection. Alternatively, or in addition, the gateway may scan for such devices upon detection of the loss or degradation of the primary internet connection. Based on metrics associated with the one or more alternative internet connections, the gateway may establish a connection with one of the one or more cellular or hotspot devices. The gateway may route internet traffic from the premises devices to the internet via the selected one of the cellular or hotspot devices. The metrics associated with the one or more cellular devices or hotspot devices may comprise one or more of signal strength, bandwidth, latency, and/or data rate. In the event the primary internet connection is reestablished or improves, the gateway may switch back to routing internet traffic via the primary internet connection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
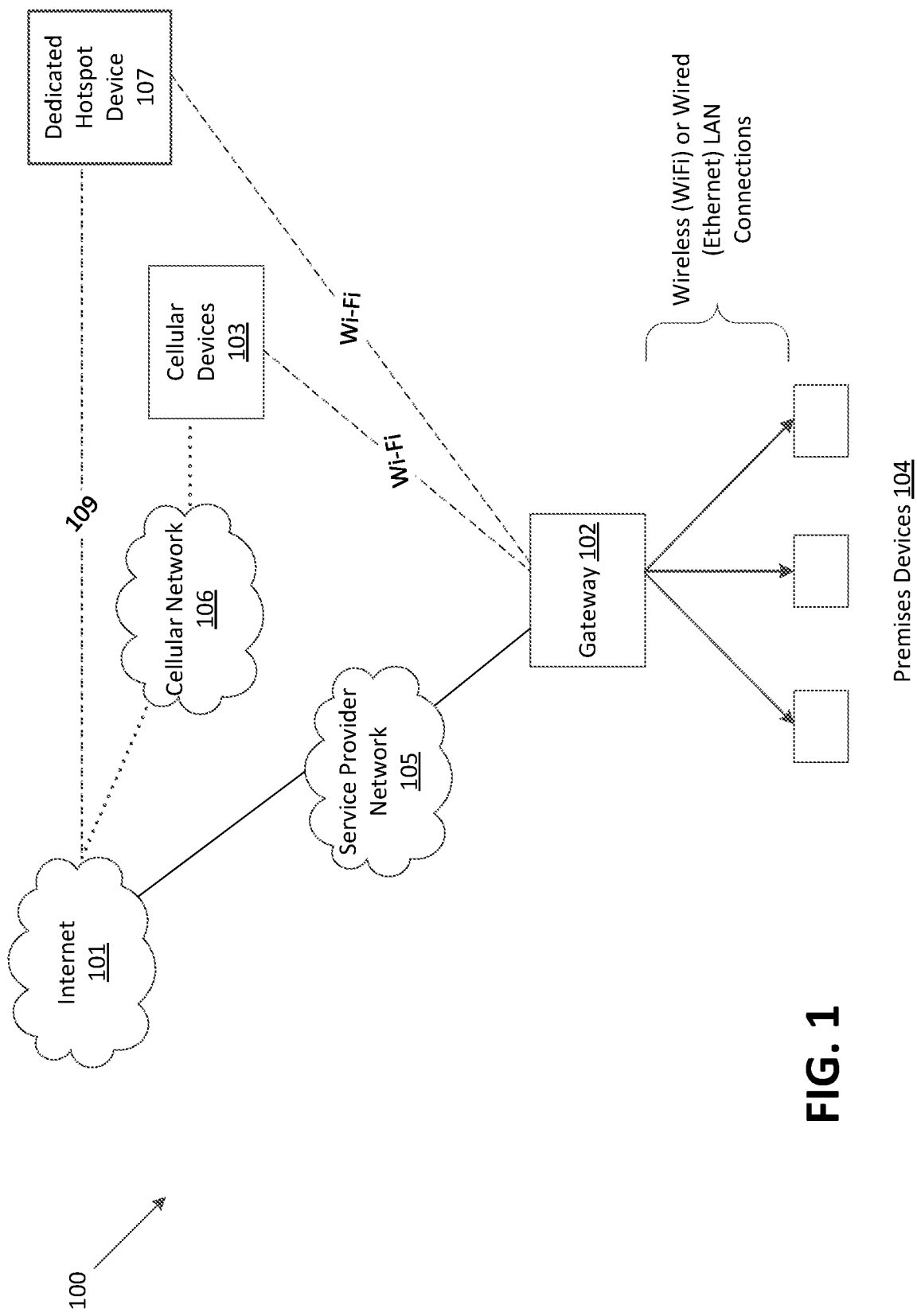
FIG. 1 shows an example system.

FIG. 1 shows an example system 100. The system 100 may comprise a plurality of premises devices 104. The premises devices 104 may comprise user devices, such as laptop computers, tablets, wearable devices, personal digital assistants (PDA's), mobile phones, or other computing devices. The premises devices 104 may comprise entertainment devices, such as set-top boxes or smart televisions. The premises devices 104 may comprise internet of things (IoT) devices, such as smart appliances, wearable, and/or automation devices. The premises devices 104 may comprise premises management and/or security system devices, such as sensors, communication devices, control panels, and/or alarms.

The system 100 may comprise a gateway device 102. The gateway device 102 may be configured to enable the premises devices 104 to establish a wired or wireless connection to the gateway device 102 for purposes of communicating with the gateway device 102 and other network apparatuses beyond the gateway device 102, such as the internet 101. The gateway device 102 may be configured to establish a wired and/or wireless local area network to which the premises devices 104 may connect. For purposes of communicating wirelessly, the gateway device 102 may implement a wireless access technology, such as the IEEE 802.11 ("Wi-Fi") radio access technology. In other implementations, other radio access technologies may be employed, such as IEEE 802.16 or 802.20 ("WiMAX"), IEEE 802.15.4a ("Zigbee"), or 802.15.3c ("UWB"). For purposes of communicating with the gateway device 102 via a wired connection, the gateway device 102 may be configured to implement a wired local area network technology, such as IEEE 802.3 ("Ethernet") or the like.

The gateway device 102 may comprise a router. The gateway device 102 may comprise a modem. The gateway device 102 may be configured to provide a first connection to the internet 101 via a service provider network 105, such as a network operated by a cable television system operator or other communications service provider. The service provider network 105 may comprise any of a variety of types of networks, such as, for example, a coaxial cable network, a fiber-optic cable network, a hybrid fiber-coaxial (HFC) network, a satellite transmission channel, a DSL connection or the like.

The gateway device 102 may be configured to receive data traffic from the premises devices 104, such as via a Wi-Fi network established by the gateway device 102 at the premises. The gateway device 102 may be configured to route the data traffic to the internet 101 via the first internet connection provided by the service provider network 105.

The system may comprise one or more cellular devices 103. The premise devices 104 may comprise one or more of the cellular devices 103. The cellular devices 103 may be configured to connect to the internet 101 via a second internet connection provided by a cellular network 106 to which the cellular device 103 may be connected. The cellular network 106 may comprise a cellular network (e.g., 3G, 4G, LTE, or 5G). The cellular device 103 may be configured to operate as a hotspot to enable other devices to connect to the cellular device 103 in order to share its connection to the internet 101 via the cellular network 106. The hotspot provided by the cellular device 103 may comprise a Wi-Fi hotspot. The cellular device 103 may comprise a mobile phone, and the hotspot provided by the device may comprise a personal hotspot. The cellular device 103 may comprise a device associated with an internet and/or cellular service provider, and the hotspot may comprise a dedicated hotspot whose primary purpose is to provide internet connectivity to other devices, such as devices in an area around the hotspot. A cellular device may comprise a public device. The public device may provide access to the internet 101 via, for example, a 3G, 4G, LTE and/or 5G connection. The public device may comprise an alternate communication channel for internet connectivity, such as via radio frequency (RF) signals or a land-line connection.

The system may further comprise a dedicated hotspot device 107, which may provide another connection 109 to the internet. The dedicated hotspot device 107 may be configured to enable other devices to connect to it, such as via a WiFi connection, to enable those other devices to use the internet connection provided by the dedicated hotspot device 107. The dedicated hotspot device may be operated by the operator of the service provider network 105. The dedicated hotspot device may be operated by a different service provider, such as an internet service provider or a cellular network provider. The dedicated hotspot device 107 may comprise a public device and/or one of many devices located throughout a city or other geographic area, such as in a grid or web. The hotspot device 107 may provide access to the internet 101 via, for example, a 3G, 4G, LTE and/or 5G connection. The hotspot device 107 may provide access to the internet 101 via other forms of connection, such as via radio frequency (RF) signals or a land-line connection.

The gateway device 102 may be configured to determine a change in the first internet connection provided via the service provider network 105. The change may comprise a loss of the first internet connection. The change may comprise a degradation of the first internet connection. The degradation may comprise or be associated with one or more of reduced bandwidth, excessive packet loss, improper or failed routing, or other reduction in quality of service associated with the first internet connection. The degradation may be determined based on one or more of a measured quantity of packet loss, a measured level of latency, a measured level of latency variability, a determined quantity of packet retries, a determination of a failure to route to specific networks, or other lower-level network metrics indicative of poor performance or quality of service associated with the first internet connection. The gateway device 102 may be configured to determine that the change in the first internet connection occurs for a time period that meets and/or exceeds a predetermined threshold duration. The threshold duration may comprise 1 minute, three minutes, or five minutes, as examples.

The gateway device 102 may be configured to determine one or more cellular devices 103 that are able to provide a second internet connection to use to route internet traffic from the premises devices 104. The gateway device 102 may be configured (e.g., by a user, service provider, ISP, etc.) to detect the one or more cellular devices 103. For example, the user may input, via a user interface, an indication that one or more of the cellular devices 103 are typically present at the premises and capable of providing a cellular connection to the internet, via for example, a personal hotspot capability of the cellular device 103. The user interface for configuring the gateway device may be presented via a mobile application installed on one of the cellular devices 103 associated with the user, such as the user's mobile phone.

The gateway device 102 may be configured to detect the one or more cellular devices 103 without user input. For example, the gateway device 102 may be configured to detect an available WiFi connection to each cellular device 103. For example, the gateway device 102 may be configured to detect a beacon transmitted by a cellular device 103 indicative of a WiFi hotspot provided by the cellular device 103. The gateway may monitor or scan, for example periodically, for the presence of such cellular devices 103 providing alternative connections so that it is aware of such devices in the event of a loss or degradation of the first (e.g., primary) internet connection. Alternatively, or in addition, the gateway may scan for such cellular devices upon detection of the loss or degradation of the primary internet connection.

The gateway device 102 may be configured to establish a connection to an available WiFi hotspot of one or more of the cellular devices using one or more credentials associated with the WiFi hotspot or the one or more cellular devices. The one or more credentials may be pre-provisioned in the gateway device 102. The one or more credentials may be pre-provisioned by a user of the gateway device 102, such as during a setup operation associated with the gateway device 102. The one or more credentials may be pre-provisioned by a user of the gateway device 102 using a mobile application on one of the cellular devices 103 associated with the user that is configured to communicate with the gateway device 102, such as the user's mobile phone.

The gateway device 102 may be configured to determine that more than one cellular device 103 is available to provide an internet connection via the cellular network 106 (or via another cellular network). Based on a loss or degradation of the first internet connection, the gateway device 102 may be configured to query the cellular devices 103. Alternatively, or in addition, the gateway device 102 may be configured to periodically query the cellular devices 103 prior to any determined loss or degradation of the first internet connection. The cellular devices 103 may be configured to respond to the querying. Each of the cellular devices 103 may have a mobile application installed that enables the cellular device to communicate with the gateway device 102 for the purpose of providing the gateway device 102 with an alternative connection to the internet. The mobile application may use hotspot functionality of the cellular device. The mobile application may provide routing information to the gateway device 102. Based on querying the cellular devices 103, the gateway device 102 may be configured to determine which cellular devices 103 are within communication (e.g., WiFi) range of the gateway device 102. Based on querying the cellular devices, the gateway device 102 may be configured to determine internet connectivity statistics associated with the cellular devices, such as bandwidth and latency.

The gateway 102 may be configured to select one of the cellular devices to use to route internet traffic. For example, the gateway device 102 may be configured to determine the cellular device 103 that has the best cellular internet connection. The gateway device 102 may be configured to determine which cellular device 103 has the best cellular connection based on the connectivity statistics associated with the cellular devices. The gateway device 102 may be configured to select one of the cellular devices 103 based on one or more metrics associated with the cellular devices and/or cellular networks to which they are connected. The one or more metrics may comprise one or more of a signal strength, a latency, a bandwidth, a data rate, connection quality metrics (e.g., jitter), historical connection quality metrics, traffic limits (e.g., a monthly data limit), or a data cost associated with the cellular device 103 and/or its cellular network connection. The data cost may be associated with a service provider that provides cellular data connectivity to the cellular device(s) 103. The data cost may be based on a subscription, such as a subscription with the service provider. The gateway device may compare the connectivity of the alternative internet connections (e.g., to each other or to the first internet connection). The gateway device may select the cellular device with the best relative connectivity. The gateway device may determine to continue routing internet traffic via the first internet connection if the connectivity of the cellular devices is determined not to be better than the connectivity of the first internet connection.

The gateway device 102 may be configured to determine a dedicated hotspot device 107 that is able to provide a second internet connection to use to route internet traffic from the premises devices 104. The gateway device 102 may be configured to detect the dedicated hotspot device 107. The gateway 102 may be configured to detect an available WiFi connection to the dedicated hotspot device 107. For example, the gateway 102 may be configured to detect a beacon transmitted by the dedicated hotspot device 107 indicative of an available WiFi connection to the dedicated hotspot device 107. The gateway may monitor or scan, for example periodically, for the presence of such a hotspot device 107 providing an alternative connection so that it is aware of such device in the event of a loss or degradation of the first (e.g., primary) internet connection. Alternatively, or in addition, the gateway may scan for such a hotspot device 107 upon detection of the loss or degradation of the primary internet connection. The gateway device 102 may be configured to establish a connection to the dedicated hotspot device 107 using one or more credentials associated with the dedicated hotspot device. The one or more credentials may be pre-provisioned in the gateway device 102. The one or more credentials may be pre-provisioned by a user of the gateway device 102, such as during a setup operation associated with the gateway.

The gateway device 102 may be configured to receive data, such as internet traffic, from the premises devices 104. The gateway device 102 may be configured to route the data to the internet via the second internet connection provided by the determined cellular device 103 or dedicated hotspot device 107. The gateway device 102 may be configured to route the data via the second internet connection provided by the determined cellular device 103 or dedicated hotspot device 107 instead of via the first internet connection provided by the service provider network 105. The gateway device 102 may be configured to route the data via the second internet connection without receiving a command, prompt, or request from a user.

Alternatively, or in addition, the gateway device 102 may be configured to designate the determined cellular device 103 as providing the second internet connection. Based on that designation, the determined cellular device 103 may send its internet traffic (e.g., data) directly via the second internet connection that it provides. For other cellular devices 103 not selected by the gateway device 102 to serve as the second internet connection, the gateway device 102 may be configured to, upon receiving data from any of such other cellular devices 103, send a signal or notification back to the sending cellular device 103 to cause that sending cellular device 103 to send its data directly to the determined cellular device 103 that is providing the second internet connection, or routing by the determined cellular device to the Internet.

Alternatively, or in addition, upon determining a loss or degradation of the primary internet connection, the gateway device 102 may be configured to determine which cellular devices 103 and/or hotspot devices 107 are in communication with the gateway device 102. Based on that determination, the gateway device 102 may then send a message, alert, or other signal to each of those devices that are in communication with the gateway device 102, that they should route future internet traffic (e.g., data) via the determined cellular device 103 or hotspot device 107 that is serving as the second internet connection. Upon detecting the restoration of, or improvement in the quality of the primary internet connection, the gateway device 102 may be configured to alert each cellular device 103 to again route their internet traffic via the gateway device 102.

The gateway device 102 may be configured to send a notification indicative of the internet traffic being routed via the second internet connection provided by the determined cellular device 103 or dedicated hotspot device 107. The gateway device 102 may be configured to send the notification to one or more of the premises devices 104 or to one of the cellular devices 103 associated with the user, such as the user's mobile phone. The gateway device 102 may be configured to send the notification to one or more accounts. The accounts may comprise accounts of one or more users associated with the premises. The one or more accounts may comprise one or more accounts of subscribers of a service from a provider.

The gateway device 102 may be configured to route the internet traffic via the second internet connection until the first internet connection provided by the service provider network 105 has been reestablished or is no longer degraded. The gateway device 102 may be configured to route the internet traffic via the second internet connection until a metric associated with the first internet connection has improved. The gateway device 102 may be configured to route the internet traffic via the second internet connection until a loss or degradation of the second internet connection occurs. Loss or degradation of the second connection may occur based on the determined cellular device 103 moving, such as outside a premises. Loss or degradation of the second connection may occur based on a data limit associated with the determined cellular device 103 being reached or exceeded.

Based on detection of a loss or degradation of the second internet connection, or at times (e.g., periodically) prior to any such loss or degradation (e.g., in anticipation that such loss or degradation may occur), the gateway device 102 may be configured to determine another cellular device 103 or another dedicated hotspot device 107. The degradation of the second internet connection may comprise a change in connectivity associated with the second internet connection. The degradation may be determined based on a quantity of packet loss, a level of latency, a level of latency variability, a predetermined quantity of retries, a failure to route to specific networks, or other lower-level network metrics indicative of poor connectivity, and/or failure to route to specific networks. In the event the gateway device 102 determines a degradation or loss of the second internet connection, the gateway device 102 may be configured to route internet traffic via a third internet connection provided by the other determined cellular device 103 or a dedicated hotspot device 107.

Based on the first internet connection being reestablished, its connectivity improving, and/or loss or degradation of the second internet connection, the gateway device 102 may be configured to route the internet traffic via the first internet connection—despite the initial loss of degradation of the first internet connection. The gateway device 102 may be configured to send a notification indicating that the first internet connection has been reestablished or improved and/or that the internet traffic is being routed via the first internet connection.

Figure 2:
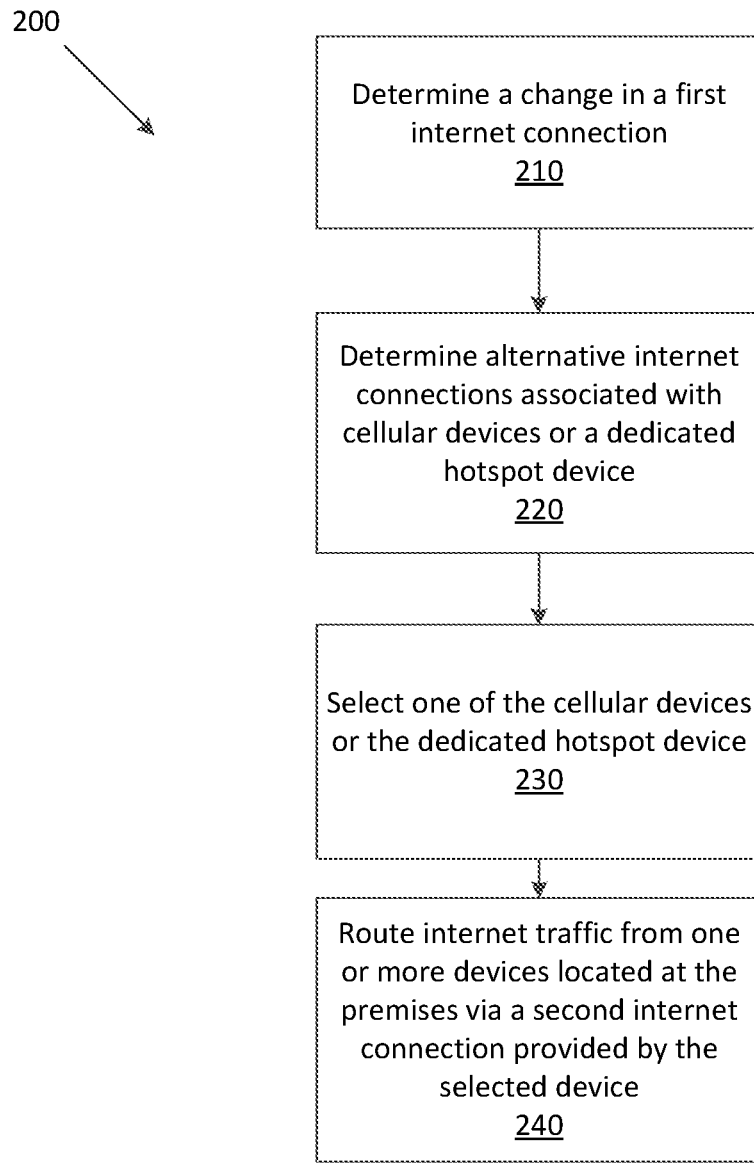
FIG. 2 shows an example method.

FIG. 2 shows an example method 200. At step 210, a change in a first internet connection provided by a service provider (e.g., the first internet connection via the service provider network 105 in FIG. 1) may be determined. The change in the first internet connection may be determined by a gateway device (e.g., the gateway device 102 in FIG. 1). The first internet connection may comprise a primary internet connection. The change may comprise a loss of the first internet connection. The change may comprise a degradation of the first internet connection. The degradation may comprise or be associated with one or more of reduced bandwidth, excessive packet loss, improper or failed routing, or other reduction in performance or quality of service associated with the first internet connection. The degradation may be determined based on one or more of a measured quantity of packet loss, a measured level of latency, a measured level of latency variability, a determined quantity of packet retries, a determination of a failure to route to specific networks, or other lower-level network metrics indicative of poor performance or quality of service associated with the first internet connection. The change may be determined to last for (e.g., meet and/or exceed) a predetermined threshold time period. The threshold time period may comprise 1 minute, three minutes, or five minutes, as examples.

At step 220, one or more alternative (e.g., secondary) internet connections may be determined. An alternative internet connection may comprise a cellular internet connection via a cellular device (e.g., one of the cellular devices 103 in FIG. 1). The cellular internet connection may be determined by the gateway device. The cellular internet connection may be determined based on the change in the first internet connection. The gateway device may be configured to detect the one or more cellular devices providing alternative internet connections. The gateway device may be configured by a user to detect the one or more cellular devices. For example, the user may input, via a user interface, an indication that one or more of the cellular devices are typically present at the premises and capable of providing a cellular connection to the internet, via for example, a personal hotspot capability of the cellular device. The user interface for configuring the gateway device may be presented via a mobile application installed on one of the cellular devices associated with the user, such as the user's mobile phone.

The gateway device may be configured to detect available WiFi connections to the cellular devices. For example, the gateway device may be configured to detect a beacon transmitted by a cellular device indicative of a WiFi hotspot provided by the cellular device. The gateway device may be configured to establish a connection to the WiFi hotspot using one or more credentials associated with the WiFi hotspot. The one or more credentials may be pre-provisioned in the gateway device. The one or more credentials may be pre-provisioned by a user of the gateway device, such as during a setup operation associated with the gateway device. It may be determined that more than one cellular device is available to provide an internet connection via the cellular network (or via another cellular network).

Based on the loss or degradation of the first internet connection, or at times prior to any such loss or degradation, the gateway device may be configured to query the cellular devices. The cellular devices may be configured to respond to the querying. Each of the cellular devices may have a mobile application installed that enables the cellular device to communicate with the gateway device for the purpose of providing the gateway device with an alternative connection to the internet. The mobile application may use hotspot functionality of the cellular device. The mobile application may provide routing information to the gateway device. Based on querying the cellular devices, the gateway device may be configured to determine which cellular devices are in communication (e.g., WiFi) range of the gateway device. Based on querying the cellular devices, the gateway device may be configured to determine connectivity statistics associated with the cellular devices, such as bandwidth and latency.

The alternative internet connections may comprise an internet connection via a dedicated hotspot device (e.g., the hotspot device 107 in FIG. 1). The dedicated hotspot device may be able to provide a second internet connection to use to route internet traffic from the premises devices. The gateway device may be configured to detect the dedicated hotspot device. The gateway device may be configured to detect an available WiFi connection to the dedicated hotspot device. For example, the gateway device may be configured to detect a beacon transmitted by the dedicated hotspot device indicative of an available WiFi connection to the dedicated hotspot device. The gateway device may be configured to establish a connection to the dedicated hotspot device using one or more credentials associated with the dedicated hotspot device. The one or more credentials may be pre-provisioned in the gateway device. The one or more credentials may be pre-provisioned by a user of the gateway device, such as during a setup operation associated with the gateway device.

At step 230, one of the cellular devices or the dedicated hotspot device may be selected to use to provide an alternative internet connection. The selection may be based on a comparison, by the gateway device for example, of the connectivity of the alternative internet connections (e.g., to each other or to the first internet connection). The gateway device may be configured to determine which cellular device has the best cellular connection based on the connectivity statistics associated with the cellular devices. The gateway device may be configured to select one of the cellular devices based on one or more other metrics associated with the cellular devices and/or cellular networks to which they are connected. The one or more metrics may comprise one or more of a signal strength, a latency, a bandwidth, a data rate, connection quality metrics (e.g., jitter), historical connection quality metrics, traffic limits (e.g., a monthly data limit), or a data cost associated with the cellular device and/or its cellular network connection. The data cost may be associated with a service provider that provides cellular data to the cellular device(s). The data cost may be based on a subscription, such as a subscription with the service provider. The gateway device may select the cellular device with the best relative connectivity. The gateway device may determine to continue routing internet traffic via the first internet connection based on the connectivity of the cellular devices not being better than the connectivity of the first internet connection.

At step 240, data, such as internet traffic, may be routed via a second internet connection provided by the selected cellular device or dedicated hotspot device (e.g., the second internet connection via the cellular network 106 in FIG. 1). The internet traffic may be received from one or more devices located at the premises (e.g., premises devices 104 in FIG. 1). Routing the internet traffic may comprise receiving the internet traffic from the premises devices and sending the internet traffic to the selected cellular device or dedicated hotspot. The internet traffic may be routed via the second internet connection independent of receiving a command, prompt, and/or request from a user.

A notification indicating that the internet traffic is being routed via the second internet connection may be sent to one or more devices, such as the premises devices, cellular devices, or other user devices. The notification may be sent to one or more accounts associated with users associated with the premises. The notification may be sent based on selecting the cellular device, as in step 230. The notification may be sent based on routing the internet traffic via the second internet connection, as in step 240.

Figure 3:
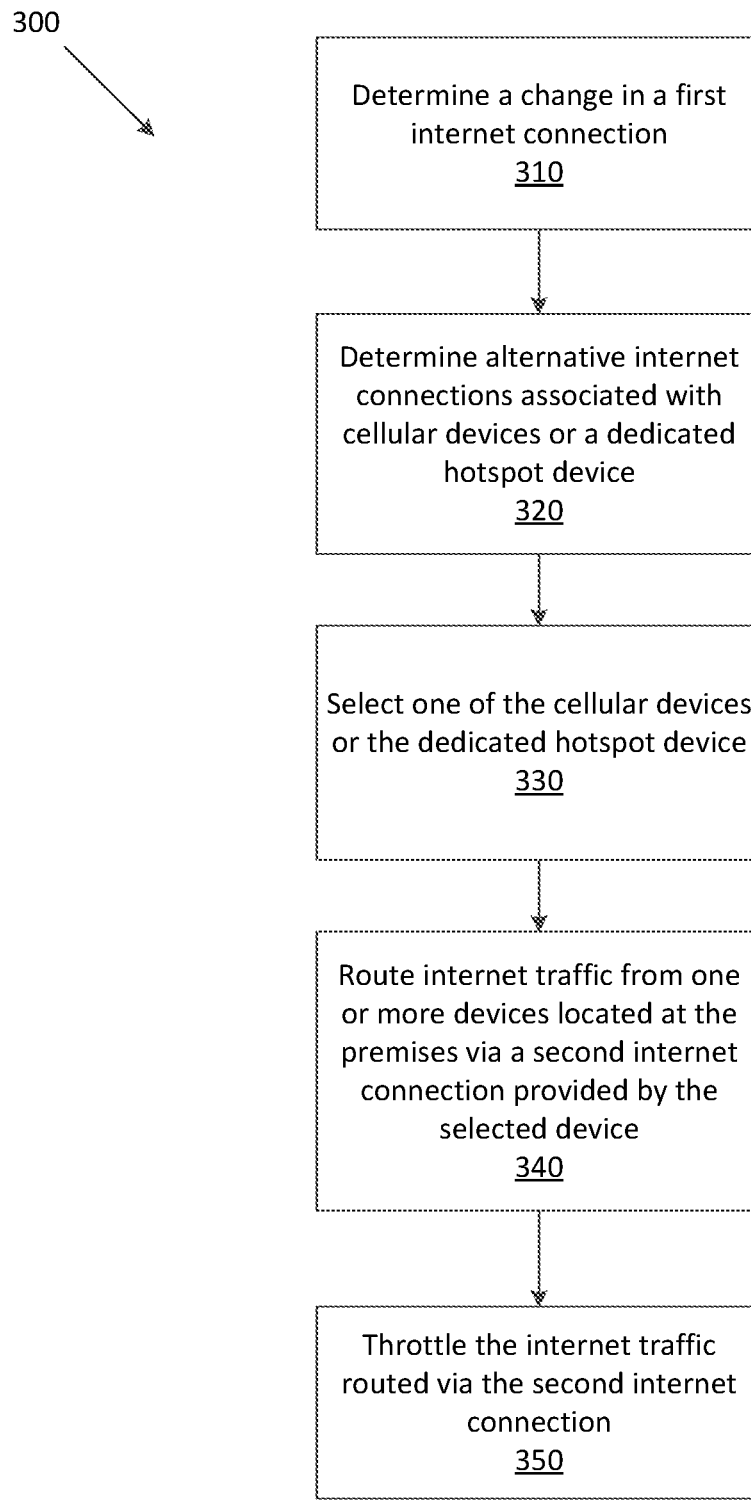
FIG. 3 shows an example method.

FIG. 3 shows an example method 300. At step 310, a change in a first internet connection (e.g., the first internet connection via the service provider network 105 in FIG. 1) may be determined. The change in the first internet connection may be determined by a gateway device (e.g., the gateway device 102 in FIG. 1). The degradation may comprise or be associated with one or more of reduced bandwidth, excessive packet loss, improper or failed routing, or other reduction in performance or quality of service associated with the first internet connection. The degradation may be determined based on one or more of a measured quantity of packet loss, a measured level of latency, a measured level of latency variability, a determined quantity of packet retries, a determination of a failure to route to specific networks, or other lower-level network metrics indicative of poor performance or quality of service associated with the first internet connection. The change may be determined to last for (e.g., meet and/or exceed) a predetermined threshold time period. The threshold time period may comprise 1 minute, three minutes, or five minutes, as examples.

At step 320, one or more alternative (e.g., secondary) internet connections may be determined. An alternative internet connection may comprise a cellular internet connection via a cellular device (e.g., one of the cellular devices 103 in FIG. 1). The cellular internet connection may be determined by the gateway device. The cellular internet connection may be determined based on the change in the first internet connection. The gateway device may be configured to detect the one or more cellular devices providing alternative internet connections. The gateway device may be configured by a user to detect the one or more cellular devices. For example, the user may input, via a user interface, an indication that one or more of the cellular devices are typically present at the premises and capable of providing a cellular connection to the internet, via for example, a personal hotspot capability of the cellular device. The user interface for configuring the gateway device may be presented via a mobile application installed on one of the cellular devices associated with the user, such as the user's mobile phone.

The gateway device may be configured to detect available WiFi connections to the cellular devices. For example, the gateway device may be configured to detect a beacon transmitted by a cellular device indicative of a WiFi hotspot provided by the cellular device. The gateway device may be configured to establish a connection to the WiFi hotspot using one or more credentials associated with the WiFi hotspot. The one or more credentials may be pre-provisioned in the gateway device. The one or more credentials may be pre-provisioned by a user of the gateway device, such as during a setup operation associated with the gateway device. It may be determined that more than one cellular device is available to provide an internet connection via the cellular network (or via another cellular network).

Based on the loss or degradation of the first internet connection, the gateway device may be configured to query the cellular devices. The cellular devices may be configured to respond to the querying. Each of the cellular devices may have a mobile application installed that enables the cellular device to communicate with the gateway device for the purpose of providing the gateway device with an alternative connection to the internet. The mobile application may use hotspot functionality of the cellular device. The mobile application may provide routing information to the gateway device. Based on querying the cellular devices, the gateway device may be configured to determine which cellular devices are in communication (e.g., WiFi) range of the gateway device. Based on querying the cellular devices, the gateway device may be configured to determine connectivity statistics associated with the cellular devices, such as bandwidth and latency.

The alternative internet connections may comprise an internet connection via a dedicated hotspot device (e.g., the hotspot device 107 in FIG. 1). The dedicated hotspot device may be able to provide a second internet connection to use to route internet traffic from the premises devices. The gateway device may be configured to detect the dedicated hotspot device. The gateway device may be configured to detect an available WiFi connection to the dedicated hotspot device. For example, the gateway device may be configured to detect a beacon transmitted by the dedicated hotspot device indicative of an available WiFi connection to the dedicated hotspot device. The gateway device may be configured to establish a connection to the dedicated hotspot device using one or more credentials associated with the dedicated hotspot device. The one or more credentials may be pre-provisioned in the gateway device. The one or more credentials may be pre-provisioned by a user of the gateway device, such as during a setup operation associated with the gateway device.

At step 330, one of the cellular devices or the dedicated hotspot device may be selected to use to provide an alternative internet connection. The selection may be based on a comparison, by the gateway device for example, of the connectivity of the alternative internet connections (e.g., to each other or to the first internet connection). The gateway device may be configured to determine which cellular device has the best cellular connection based on the connectivity statistics associated with the cellular devices. The gateway device may be configured to select one of the cellular devices based on one or more other metrics associated with the cellular devices and/or cellular networks to which they are connected. The one or more metrics may comprise one or more of a signal strength, a latency, a bandwidth, a data rate, connection quality metrics (e.g., jitter), historical connection quality metrics, traffic limits (e.g., a monthly data limit), or a data cost associated with the cellular device and/or its cellular network connection. The data cost may be associated with a service provider that provides cellular data to the cellular device(s). The data cost may be based on a subscription, such as a subscription with the service provider. The gateway device may select the cellular device with the best relative connectivity. The gateway device may determine to continue routing internet traffic via the first internet connection based on the connectivity of the cellular devices not being better than the connectivity of the first internet connection.

At step 340, internet traffic may be routed via the second internet connection provided by the selected cellular device or dedicated hotspot device (e.g., the second internet connection via the cellular network 106 in FIG. 1). The internet traffic may be received from one or more devices located at the premises (e.g., premises devices 104 in FIG. 1), such as by the gateway device. The gateway device may route the internet traffic via the second internet connection. Routing the internet traffic may comprise receiving the internet traffic from the devices and sending the internet traffic to the selected cellular device of dedicated hotspot. The internet traffic may be routed via the second internet connection independent of receiving a command, prompt, and/or request from a user.

A notification indicating that the internet traffic is being routed via the second internet connection may be sent to one or more devices, such as one or more of the premises devices, the cellular devices, or other user devices. The notification may be sent to one or more accounts associated with users associated with the premises. The notification may be sent based on selecting the cellular device, as in step 330. The notification may be sent based on routing the internet traffic via the second internet connection, as in step 340.

At step 350, the internet traffic may be throttled. The gateway device may throttle the internet traffic. The internet traffic may be throttled based on a data limit (e.g., a monthly data limit) being reached or exceeded. The internet traffic may be throttled as it is routed via the second internet connection. The internet traffic may be throttled based on a bandwidth of the second internet connection. The internet traffic may be throttled based on a load of the internet traffic. Throttling the internet traffic may comprise lowering the bandwidth of subsequent communications. Based on the internet traffic being throttled, the internet traffic may be routed via the first internet connection.

For example, the device may have a monthly data limit of 5 gigabytes (GB). Based on the 5 GB being used within a monthly period, the bandwidth of the second internet connection may drop from 5 megabits per second (Mbps) to 2 Mbps. If the first internet connection—even when degraded—provides 3 Mbps, the internet traffic may again be routed via the first internet connection. If the first internet connection degrades to 1 Mbps, the internet traffic may again be routed via the alternate second internet connection.

Figure 4:
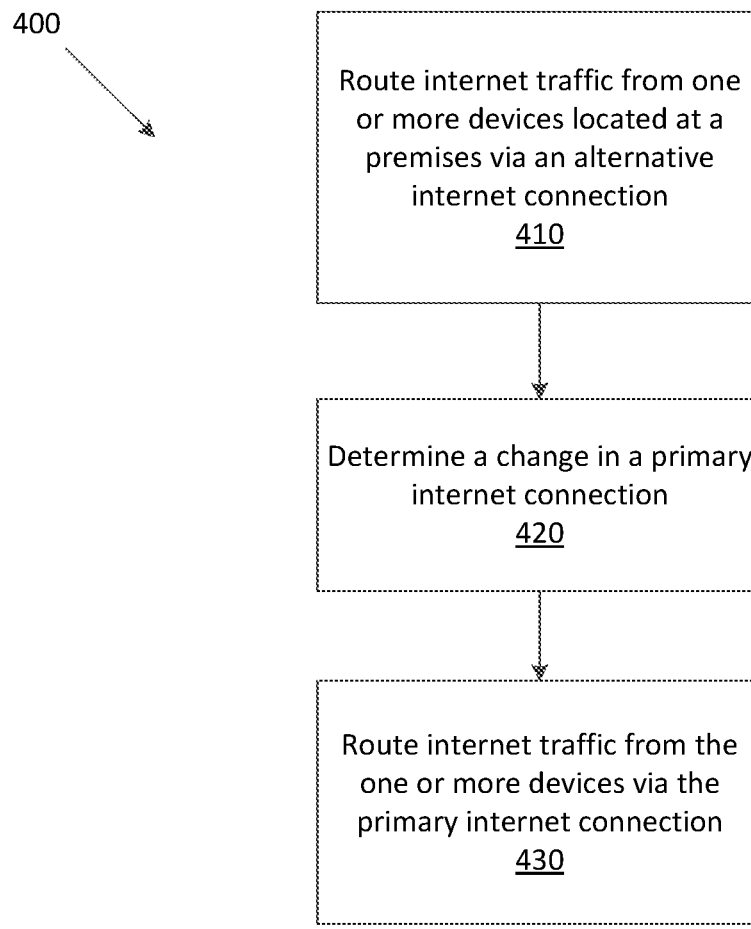
FIG. 4 shows an example method.

FIG. 4 shows example method 400. At step 410, data, such as internet traffic, may be routed by a gateway device via an alternative internet connection provided by a cellular device (e.g., an alternative internet connection via the cellular network 106 in FIG. 1) or a dedicated hotspot device (e.g., the hotspot device 107 in FIG. 1). The data may be received from one or more devices located at the premises (e.g., premises devices 104 in FIG. 1). Routing the internet traffic may comprise receiving the internet traffic from the devices and sending the internet traffic to the cellular device or dedicated hotspot device. The internet traffic may be routed via the first alternative internet connection independent of receiving a command, prompt, and/or request from a user.

At step 420, a change in a primary internet connection (e.g., the first or primary internet connection via the service provider network 105 in FIG. 1) may be determined. The change in the second internet connection may be determined by the gateway device. The change in the second internet connection may comprise a connectivity associated with the primary internet connection improving. The change in the primary internet connection may comprise a measure of a quality of the connectivity of the primary internet connection improving by a predetermined threshold amount. The change in the second internet connection may comprise the change lasting for at least a predetermined threshold time.

At step 430, internet traffic may be routed via the primary internet connection. The internet traffic may be routed via the primary internet connection based on the change in the second internet connection. The internet traffic may be routed via the second internet connection based on the connectivity of the primary internet connection being better than the alternative internet connection, such as the primary internet connection having a greater bandwidth or lower latency. The internet traffic may be routed by the gateway device. The internet traffic may comprise internet traffic from the one or more of the premises devices. The internet traffic may be routed via the primary internet connection instead of via the alternative internet connection. A notification indicating that the primary internet connection has improved and/or that the internet traffic is being routed via the primary internet connection may be sent to one or more devices.

For example, a gateway device at a house may determine that the connectivity of the primary internet connection provided by a cable network has dropped below a predetermined threshold. For example, the gateway may determine that latency of the internet connection exceeds 1000 milliseconds or that bandwidth has dropped below 100 kilobits per second (Kbps). The gateway device may determine that this degradation in connectivity has not improved over a duration of five minutes.

The gateway device may determine cellular devices at the house. The cellular devices may include a tablet device, a mobile phone, and a dedicated hotspot. The gateway device may determine that the cellular connection of the mobile phone is better than the cellular connections of the tablet device and the dedicated hotspot.

The gateway device may connect to the cellular connection via the mobile phone. The gateway device may receive internet traffic from devices at the house, such as a laptop computer and a set-top box. The gateway device may route the internet traffic via the cellular connection. The gateway device may receive responsive internet traffic via the cellular connection and send the responsive internet traffic to the intended recipient device, such as the laptop computer or the set-top box. The gateway device may send a notification to user devices at the house indicating that internet traffic is being routed via the cellular network.

The gateway device may determine that the connectivity of the primary internet connection has improved. Based on the improvement in the primary internet connection, the gateway device may switch back to routing internet traffic from the devices at the house via the primary internet connection. The gateway device may send a notification to user devices at the house indicating that routing via the first internet connection has resumed.

Figure 5:
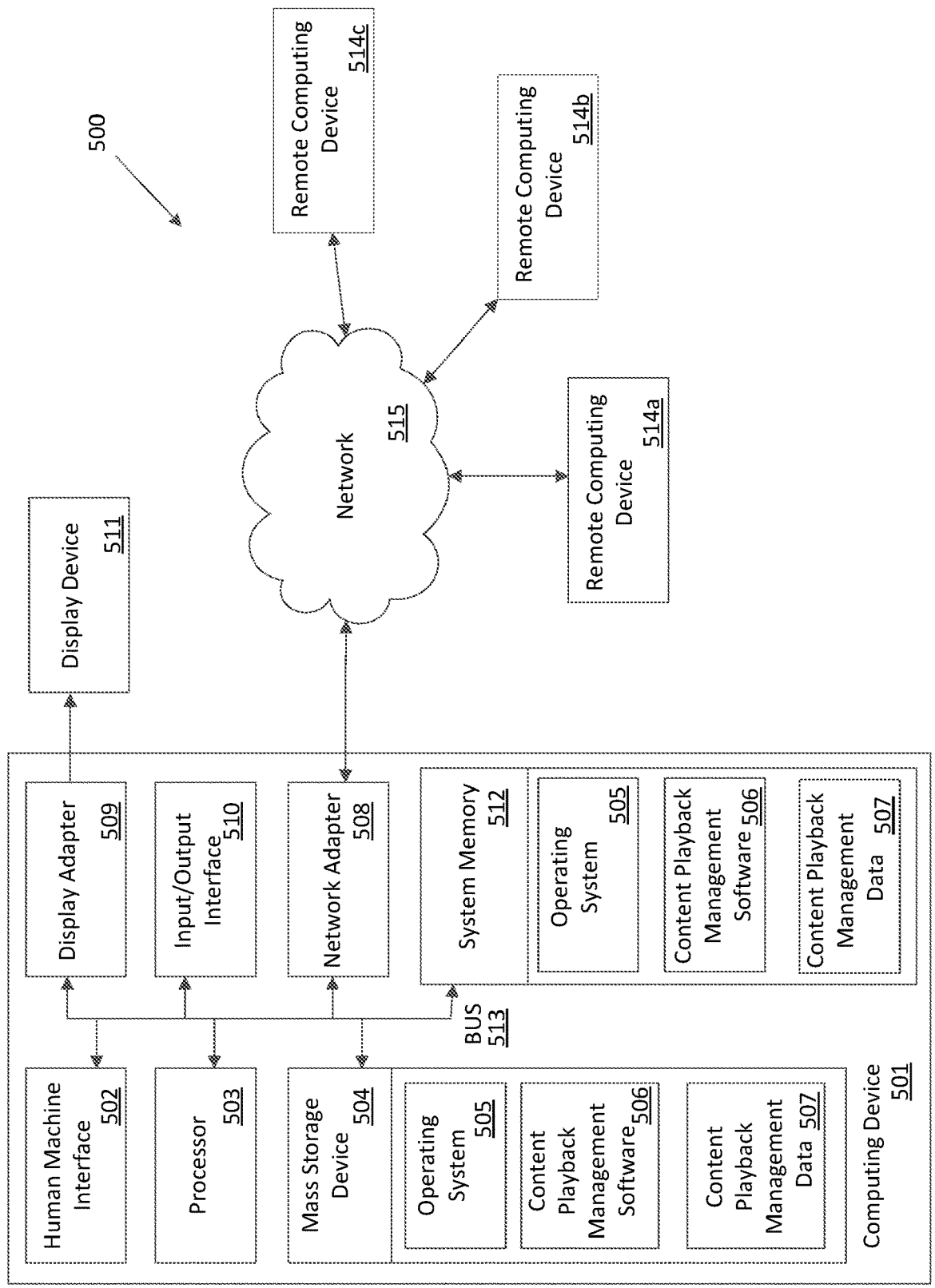
FIG. 5 shows an example computing system.

FIG. 5 shows an example system 500. The system 500 may comprise a computing device 501. One or more of the devices in FIG. 1, such as the gateway device 102, the cellular devices 103, the dedicated hotspot device 107, and/or the premises devices 104 may be embodied in the form of the computing device 501.

The computing device 501 may comprise a system bus 513. The system bus 513 may comprise one or more bus structures, including a memory bus or memory controller, a peripheral bus, an accelerated graphics port, and a processor or local bus using any of a variety of bus architectures. The architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description may also be implemented over a wired or wireless network connection and each of the subsystems, including the processor 503, a mass storage device 504, an operating system 505, content playback management software 506, content playback management data 507, a network adapter 508, system memory 512, an Input/Output Interface 510, a display adapter 509, a display device 511, and a human machine interface 502, may be contained within one or more remote computing devices 514a,b,c at physically separate locations, connected through buses of this form, in effect implementing a fully distributed system.

The computing device 501 may comprise a variety of computer readable media. Exemplary readable media may be any available media that is accessible by the computing device 501 and comprises, for example and not meant to be limiting, both volatile and non-volatile media, removable and non-removable media. The system memory 512 may comprise the intelligent cache. The system memory 512 comprises computer readable media in the form of volatile memory, such as random access memory (RAM), and/or non-volatile memory, such as read only memory (ROM). The system memory 512 may store data such as content playback management data 507 and/or program modules such as operating system 505 and content playback management software 506 that are immediately accessible to and/or are presently operated on by the processing unit 503.

The computing device 501 may comprise other removable/non-removable, volatile/non-volatile computer storage media. FIG. 5 shows a mass storage device 504 which may provide non-volatile storage of computer code, computer readable instructions, data structures, program modules, and other data for the computing device 501. For example and not meant to be limiting, a mass storage device 504 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored in the mass storage device 504, including for example, an operating system 505 and content playback management software 506. Each of the operating system 505 and content playback management software 506 (or some combination thereof) may comprise elements of the programming and the content playback management software 506. Content playback management data 507 may also be stored in the mass storage device 504. Content playback management data 507 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

The user may enter commands and information into the computing device 501 via an input device (not shown). Examples of such input devices comprise, but are not limited to, a keyboard, a pointing device (e.g., a "mouse"), a microphone, a joystick, a scanner, tactile input devices such as gloves, and other body coverings, and the like. These and other input devices may be connected to the processing unit 503 via a human machine interface 502 that is coupled to the system bus 513, but may be connected by other interface and bus structures, such as a parallel port, game port, an IEEE 1394 Port (also known as a Firewire port), a serial port, or a universal serial bus (USB).

A display device 511 may also be connected to the system bus 513 via an interface, such as a display adapter 509. It is contemplated that the computing device 501 may have more than one display adapter 509 and the computing device 501 may have more than one display device 511. For example, a display device may be a monitor, an LCD (Liquid Crystal Display), or a projector. In addition to the display device 511, other output peripheral devices may comprise components such as speakers (not shown) and a printer (not shown) which may be connected to the computing device 501 via Input/Output Interface 510. Any step and/or result of the methods may be output in any form to an output device. Such output may be any form of visual representation, including, but not limited to, textual, graphical, animation, audio, tactile, and the like. The display 511 and computing device 501 may be part of one device, or separate devices.

The computing device 501 may operate in a networked environment using logical connections to one or more remote computing devices 514a,b,c. The remote computing devices 514a,b,c, may comprise one or more of the devices in FIG. 1. A remote computing device may be a personal computer, portable computer, a smart phone, a server, a router, a network computer, a peer device or other common network node, and so on. Logical connections between the computing device 501 and a remote computing device 514a,b,c may be made via a network 515, such as a local area network (LAN) and a general wide area network (WAN). Such network connections may be through a network adapter 508. A network adapter 508 may be implemented in both wired and wireless environments. Such networking environments are conventional and commonplace in dwellings, offices, enterprise-wide computer networks, intranets, and the internet.

Application programs and other executable program components such as the operating system 505 are shown herein as discrete blocks, although it is recognized that such programs and components reside at various times in different storage components of the computing device 501, and are executed by the data processor(s) of the computer. An implementation of content playback management software 506 may be stored in or sent across some form of computer readable media. Any of the disclosed methods may be performed by computer readable instructions embodied on computer readable media. Computer readable media may be any available media that may be accessed by a computer. For example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The invention claimed is:

1. A method comprising:
   determining, by a gateway device located at a premises, one or more other devices configured to provide a secondary internet connection, wherein the gateway device is configured to communicate via a first internet connection;
   determining, by the gateway device, a change in the first internet connection;
   selecting, based at least in part on a latency associated with the determined one or more other devices, a selected device of the one or more other devices; and
   routing, by the gateway device and via the secondary internet connection provided by the selected device, data received from one or more premises devices located at the premises.

2. The method of claim 1, wherein the one or more other devices comprise at least one of a mobile phone, a tablet device, an internet of things (IoT) device, a wearable device, a laptop device, a cellular device, a dedicated hotspot device, or a public hotspot device.

3. The method of claim 1, wherein the first internet connection is provided via at least one of a cable or fiber optic network operated by a service provider.

4. The method of claim 1, wherein the selecting the one or more other devices is based on the change in the first internet connection occurring for a period of time that satisfies a threshold time period.

5. The method of claim 1, wherein the change in the first internet connection comprises at least one of a loss or a degradation of the first internet connection.

6. The method of claim 1, wherein the change in the first internet connection comprises one or more of reduced bandwidth, increased packet loss, improper or failed routing, or other reduction in a quality of service associated with the first internet connection.

7. The method of claim 1, wherein the routing the data via the secondary internet connection is independent of user input.

8. The method of claim 1, further comprising sending, to a user device, a notification indicative of the routing the data via the secondary internet connection.

9. The method of claim 1, further comprising throttling the data routed via the secondary internet connection.

10. The method of claim 1, further comprising:
    determining an improvement in the first internet connection; and
    routing, based on the first internet connection improving and via the first internet connection, data received from the one or more premises devices.

11. A gateway device located at a premises and comprising:
    one or more processors; and
    memory storing instructions that, when executed by the one or more processors, cause the gateway device to:
    determine, by the gateway device, one or more other devices configured to provide a secondary internet connection, wherein the gateway device is configured to communicate via a first internet connection;
    determine a change in the first internet connection;
    select, based at least in part on a latency associated with the determined one or more other devices, a selected device of the one or more other devices; and
    route, by the gateway device and via the secondary internet connection provided by the selected device, data received from one or more premises devices located at the premises.

12. The gateway device of claim 11, wherein the one or more other devices comprise at least one of a mobile phone, a tablet device, an internet of things (IoT) device, a wearable device, a laptop device, a cellular device, a dedicated hotspot device, or a public hotspot device.

13. The gateway device of claim 11, wherein the instructions cause the gateway device to select the one or more other devices based on the change in the first internet connection occurring for a period of time that satisfies a threshold time period.

14. The gateway device of claim 11, wherein the change in the first internet connection comprises at least one of a loss or a degradation of the first internet connection.

15. The gateway device of claim 11, wherein the instructions further cause the gateway device to send, to a user device, a notification indicative of the routing the data via the secondary internet connection.

16. The gateway device of claim 11, wherein the instructions further cause the gateway device to throttle the data routed via the secondary internet connection.

17. A computer readable storage medium storing instructions that, when executed, cause:
    determining, by a gateway device located at a premises, one or more other devices configured to provide a secondary internet connection, wherein the gateway device is configured to communicate via a first internet connection;
    determining, by the gateway device, a change in the first internet connection;
    selecting, based at least in part on a latency associated with the determined one or more other devices, a selected device of the one or more other devices; and
    routing, by the gateway device and via the secondary internet connection provided by the selected device, data received from one or more premises devices located at the premises.

18. The computer readable storage medium of claim 17, wherein the one or more other devices comprise at least one of a mobile phone, a tablet device, an internet of things (IoT) device, a wearable device, a laptop device, a cellular device, a dedicated hotspot device, or a public hotspot device.

19. The computer readable storage medium of claim 17, wherein the instructions cause the gateway device to select the one or more other devices based on the change in the first internet connection occurring for a period of time that satisfies a threshold time period.

20. The computer readable storage medium of claim 17, wherein the change in the first internet connection comprises at least one of a loss or a degradation of the first internet connection.

21. The computer readable storage medium of claim 17, wherein the instructions further cause sending, by the gateway device and to a user device, a notification indicative of the routing the data via the secondary internet connection.

22. The computer readable storage medium of claim 17, wherein the instructions further cause throttling, by the gateway device, the data routed via the secondary internet connection.

23. A system comprising:
one or more computing devices located at a premises configured to provide a backup internet connection; and
a gateway device located at the premises configured to:
communicate via a primary internet connection;
determine a change in the primary internet connection;
select, based at least in part on a latency associated with the one or more computing devices, a selected device of the one or more computing devices; and
route, via the backup internet connection provided by the selected device, data received from one or more premises device located at the premises.

24. The system of claim 23, wherein the one or more computing devices comprise at least one of a mobile phone, a tablet device, an internet of things (IoT) device, a wearable device, a laptop device, a cellular device, a dedicated hotspot device, or a public hotspot device.

25. The system of claim 23, wherein the gateway device is configured to select the selected device based on the change in the primary internet connection occurring for a period of time that satisfies a threshold time period.

26. The system of claim 23, wherein the change in the primary internet connection comprises at least one of a loss or a degradation of the primary internet connection.

27. The system of claim 23, wherein the gateway device is configured to send, to a user device, a notification indicative of the routing the data via the backup internet connection.

28. The system of claim 23, wherein the gateway device is configured to throttle the data routed via the backup internet connection.

29. A system comprising:
one or more computing devices located at a premises configured to provide a backup internet connection; and
a gateway device located at the premises configured to:
communicate via a primary internet connection;
determine a change in the primary internet connection;
select, based at least in part on a connection strength associated with the one or more computing devices, a selected device of the one or more computing devices; and
route, via the backup internet connection provided by the selected device, data received from one or more premises device located at the premises.

30. The system of claim 29, wherein the one or more computing devices comprise at least one of a mobile phone, a tablet device, an internet of things (IoT) device, a wearable device, a laptop device, a cellular device, a dedicated hotspot device, or a public hotspot device.

31. The system of claim 29, wherein the gateway device is configured to select the selected device based on the change in the primary internet connection occurring for a period of time that satisfies a threshold time period.

32. The system of claim 29, wherein the change in the primary internet connection comprises at least one of a loss or a degradation of the primary internet connection.

33. The system of claim 29, wherein the gateway device is configured to send, to a user device, a notification indicative of the routing the data via the backup internet connection.

34. The system of claim 29, wherein the gateway device is configured to throttle the data routed via the backup internet connection.

* * * * *